United States Patent
Wang et al.

(10) Patent No.: US 10,097,340 B1
(45) Date of Patent: Oct. 9, 2018

(54) RECEIVER FOR DETERMINING SAMPLE PHASE AND METHOD OF DETERMINING SAMPLE PHASE

(71) Applicant: Beken Corporation, Shanghai (CN)

(72) Inventors: Weifeng Wang, Shanghai (CN); Yiming Huang, Shanghai (CN)

(73) Assignee: BEKEN CORPORATION, Shanghai (CN)

( * ) Notice: Subject to any disclaimer, the term of this patent is extended or adjusted under 35 U.S.C. 154(b) by 0 days.

(21) Appl. No.: 15/853,944

(22) Filed: Dec. 25, 2017

(30) Foreign Application Priority Data

Dec. 11, 2017 (CN) .......................... 2017 1 1310955

(51) Int. Cl.
| | | |
|---|---|---|
| H04L 7/00 | (2006.01) | |
| H04L 27/06 | (2006.01) | |
| H04L 7/033 | (2006.01) | |

(52) U.S. Cl.
CPC ............ H04L 7/0087 (2013.01); H04L 7/033 (2013.01); H04L 27/06 (2013.01)

(58) Field of Classification Search
CPC ....... H04L 7/0087; H04L 27/06; H04L 7/033; H04L 7/0337; H04L 1/0054; H04L 27/2626; H04L 27/0014; H04L 7/042
USPC ......................................... 375/355, 365, 366
See application file for complete search history.

(56) References Cited

U.S. PATENT DOCUMENTS

| | | | |
|---|---|---|---|
| 6,587,500 B1* | 7/2003 | Persson ................... | H04L 7/042 370/512 |
| 6,912,259 B1* | 6/2005 | Tsumura ............... | H04B 1/7073 375/354 |
| 2002/0039395 A1* | 4/2002 | Buchwald ............. | H03L 7/0814 375/355 |
| 2006/0198481 A1* | 9/2006 | Wu ...................... | H04L 27/2662 375/355 |
| 2007/0030352 A1* | 2/2007 | Huang ..................... | H04N 5/12 348/194 |
| 2009/0135978 A1* | 5/2009 | Chang ................. | H04L 27/0014 375/371 |

(Continued)

OTHER PUBLICATIONS

Mervi Berner; Timing and Carrier Recovery; S-72.333 Postgraduate Course in Radio Communications Fall 2004/Spring 2005; Nov. 1, 2005.

(Continued)

*Primary Examiner* — Phuong Phu
(74) *Attorney, Agent, or Firm* — Perkins Coie LLP

(57) ABSTRACT

A receiver for determining sample phase comprises a sync detector to output a sample phase; an interpolator communicatively coupled to the sync detector and to generate a plurality of interpolated phases, wherein each of the interpolated phase and phases within the phase set corresponds to a respective syncword; a calculator communicatively coupled to the interpolator to calculate an error vector magnitude (EVM) of syncword corresponding respectively to each of the interpolated phase and to each of the phase within a phase set, and determine the minimum EVM among EVMs for the syncword corresponding to each of the interpolated phase and the EVM of syncword corresponding to each of the phase within the phase set; and an output unit communicatively coupled to the calculator and configured to sample and output payload signals at the phase corresponding to the minimum EVM.

10 Claims, 3 Drawing Sheets

(56) References Cited

U.S. PATENT DOCUMENTS

2009/0154601 A1* 6/2009 Furman ................ H04L 1/0054
375/324
2010/0238993 A1* 9/2010 Huang ................ H04L 7/0337
375/233

OTHER PUBLICATIONS

Li Yufeng et al.; Design and Simulation of Modulation and Demodulation Module Based on DC R Standards; Chinese Journal of Electron Devices; EEACC: 1250 doi: 10.3969 / j.issn. 1005-9490. 2014.04.013; vol. 37 No. 4, Aug. 2014.

* cited by examiner

RECEIVER FOR DETERMINING SAMPLE PHASE AND METHOD OF DETERMINING SAMPLE PHASE

CROSS-REFERENCE TO RELATED APPLICATIONS

This application claims priority to Chinese Application number 201711310955.7 entitled "Receiver for Determining Sample Phase and Method of Determining Sample Phase," filed on Dec. 11, 2017 by Beken Corporation, which is incorporated herein by reference.

TECHNICAL FIELD

The present application relates to a digital circuit and more particularly, but not exclusively, to a receiver for determining sample phase and method of determining sample phase.

BACKGROUND OF THE INVENTION

Receivers are required to work even when signals are weak. A receiver normally includes a sync detector. During transmission, the sync detector uses a sync word to synchronize a data transmission by indicating the end of header information and the start of data. Normally, the sync detector will calculate a plurality of sync word decision results in response to received sync words. Further, matching of sync word decision results with a pre-stored sync word at the sync detector indicates the received signal quality. Due to a weak signal, there may be only one sync word decision result that matches the pre-stored sync word. Taking 4 frequency-shift keying (4FSK) as an example, a sync word includes 24 symbols. Due to noise, there is a certain randomness for matching a phase with only 24 symbols included in a sync word. Further, in general, the lower a demodulation rate of the receiver, the better to reduce the system power consumption and cost. Therefore, there is at least 1/16 symbol error in the resolution of the phase, due to an oversample rate of 8. Actual simulation shows that such resolution requirements are not enough for particularly high requirement system. On the other hand, increasing the resolution will significantly increase the cost. Therefore, it is desirable to improve accuracy of synchronizing phase for receivers.

BRIEF DESCRIPTION OF THE INVENTION

According to an embodiment, a receiver comprises a sync detector configured to output a sample phase; an interpolator communicatively coupled to the sync detector and configured to generate a plurality of interpolated phases by interpolating every two neighboring phases among a phase set including the sample phase and a plurality of phases adjacent to the sample phase, wherein each of the interpolated phase and phases within the phase set corresponds to a respective syncword; a calculator communicatively coupled to the interpolator and configured to calculate an error vector magnitude (EVM) of syncword corresponding to each of the interpolated phase and calculate an EVM of syncword corresponding to each of the phase within the phase set, and determine the minimum EVM among EVMs for the syncword corresponding to each of the interpolated phase and the EVM of syncword corresponding to each of the phase within the phase set; and an output unit communicatively coupled to the calculator and configured to sample and output payload signals at the phase corresponding to the minimum EVM.

According to another embodiment of the invention, a method comprises outputting, by a sync detector, a sample phase; generating, by an interpolator communicatively coupled to the sync detector, a plurality of interpolated phases by interpolating every two neighboring phases among a phase set including the sample phase and a plurality of phases adjacent to the sample phase, wherein each of the interpolated phase and phases within the phase set corresponds to a respective syncword; calculating, by a calculator communicatively coupled to the interpolator, an error vector magnitude (EVM) of syncword corresponding to each of the interpolated phase; and calculating, by the calculator, an EVM of syncword corresponding to each of the phase within the phase set; determining, by the calculator, the minimum EVM among EVMs for the syncword corresponding to each of the interpolated phase and the EVM of syncword corresponding to each of the phase within the phase set; and sampling and outputting, by an output unit communicatively coupled to the calculator, payload signals at the phase corresponding to the minimum EVM.

An embodiment receiver improves the performance of the receiver under weak signals, therefore increasing communication distance and reliability.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Various aspects and examples of the invention will now be described. The following description provides specific details for a thorough understanding and enabling description of these examples. Those skilled in the art will understand, however, that the invention may be practiced without many of these details.

Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below, however, any terminology intended to be interpreted in any restricted manner will be overtly and specifically defined as such in this Detailed Description section.

Figure 1A:
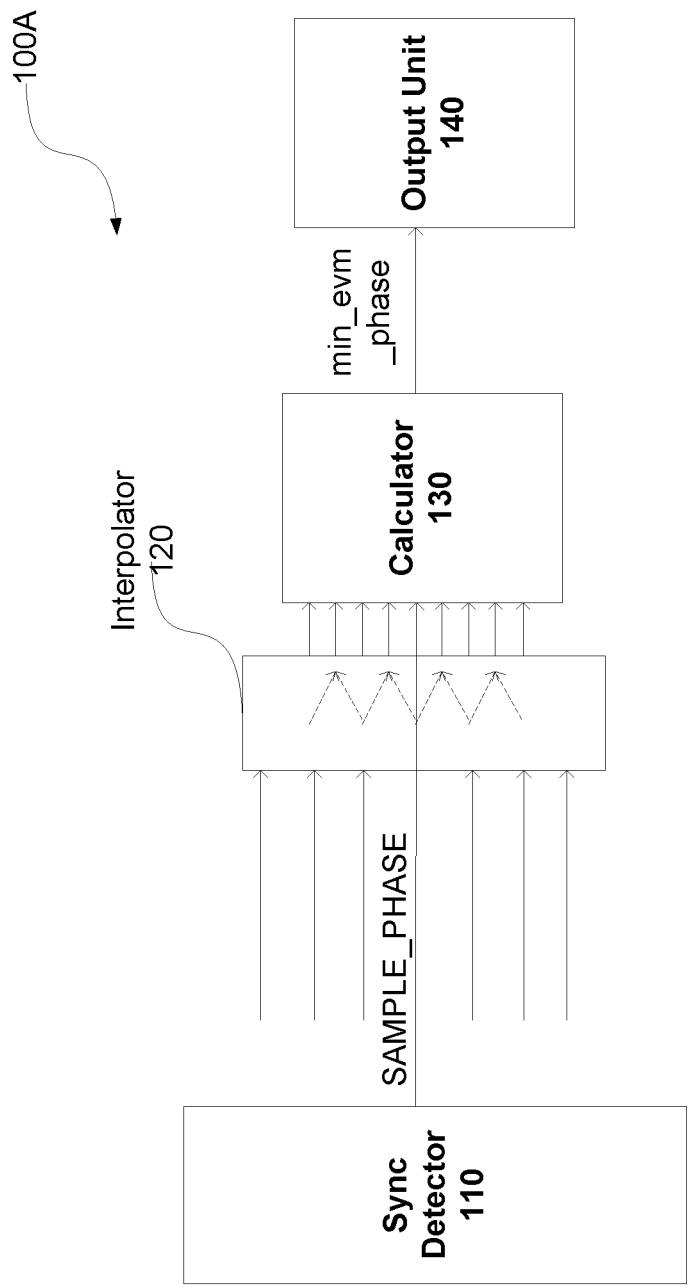
FIG. 1A is a circuit diagram of some components of a receiver according to an embodiment of the invention.

FIG. 1A is a circuit diagram of some components of a receiver 100A according to an embodiment of the invention.

The receiver 100A comprises a sync detector 110, an interpolator 120 communicatively coupled to the sync detector 110, a calculator 130 communicatively coupled to the interpolator 120, and an output unit 140 communicatively coupled to the calculator 130. The sync detector 110 is a synchronization detector and is configured to output a sample phase SAMPLE_PHASE.

Referring to FIG. 1A, the interpolator 120 is communicatively coupled to the sync detector 110 and configured to generate a plurality of interpolated phases by interpolating demodulation outputs of every two neighboring phases among a phase set including the sample phase SAMPLE_PHASE and a plurality of phases adjacent to the sample phase SAMPLE_PHASE. Each of the interpolated phase and phases within the phase set corresponds to a respective sync word. Referring to FIG. 1A, for example, the sample phase SAMPLE_PHASE=4. Then, the interpolator 120 interpolates using a plurality of phases adjacent to the sample phase SAMPLE_PHASE, such as three phases smaller than the sample phase SAMPLE_PHASE 4, and three phases larger than the sample phase SAMPLE_PHASE 4. The interpolator 120 interpolates phases 2, 3, 4 and 4, 5, 6, by interpolating demodulation outputs of every two neighbouring phases 2 and 3, 3 and 4, 4 and 5, and 5 and 6, therefore generating 4 interpolated phases. Therefore the resulting interpolated phases are 2.5, 3.5, 4.5, and 5.5. The resulting 9 phases each has a definition of $1/16 * SR$, which includes both the interpolated phases 2.5, 3.5, 4.5, and 5.5, and the phases within the phase set, that is, 2, 3, 4, 5 and 6. Therefore the 9 resulting phases are phases 2, 2.5, 3, 3.5, 4, 4.5, 5, 5.5 and 6. Note FIG. 1A shows that the interpolator 120 has 9 branches of outputs, wherein each branch corresponds to a phase.

Further, the interpolator 120 is configured to generate an interpolated demodulated value of each of the interpolated phase by averaging demodulated values of its two neighboring phases from which the interpolated phase is generated. For example, the interpolator 120 generates the interpolated demodulation value of phase 2.5 by averaging the demodulation values for phase 2 and phase 3.

The calculator 130 is communicatively coupled to the interpolator 120 and configured to calculate an error vector magnitude (EVM) of demodulated outputs corresponding to a sync word corresponding to each of the interpolated phase, such as phases 2.5, 3.5, 4.5, and 5.5. The calculator 130 further calculates an EVM of sync word corresponding to each of the phase within the phase set, such as, 2, 3, 4, 5 and 6. The calculator 130 further determines the minimum EVM min_evm_phase among EVMs for the sync word corresponding to each of the interpolated phase and the EVM of sync word corresponding to each of the phase within the phase set.

Alternatively, the calculator 130 is further configured to calculate the EVM of the sync word by averaging errors for the plurality of symbols within the sync word. The absolute error of the decision of a single symbol sym_err is abs(demod_out−sym). For example, demod_out=3.1, DC=0, then the calculator 130 calculates that the determination result sym is 3, and sym_err=0.1. The all 24 symbol errors sym_err of a sync word is averaged to get the EVM.

The output unit 140 is communicatively coupled to the calculator 130 and configured to sample and output payload signals at the phase corresponding to the minimum EVM. For example, the min_evm_phase=4.5. Therefore the output unit 140 samples payload signals at sample phase 4.5, and output payload signals sampled at phase 4.5. Further, the DC value, for example, 0.2, corresponds to the phase corresponding to the minimum EVM min_evm_phase, is used as a sample payload decision threshold.

In an embodiment, the min_evm_phase=4.5. 4.5 is an interpolated phase, which is not one of the original 8 phases. Therefore, the interpolator 120 interpolates the phase corresponding to the minimum EVM, and samples and outputs payload signals at the interpolated phase 4.5 corresponding to the minimum EVM. As the sample phase is known, which equals phase 4.5, only one interpolation is needed for the payload.

Alternatively, the min_evm_phase=4. 4 is one of the original 8 phases. Therefore, the output unit 140 samples and output payload signals at phase 4 corresponding to the minimum EVM. No interpolation is needed for sampling payload.

Figure 1B:
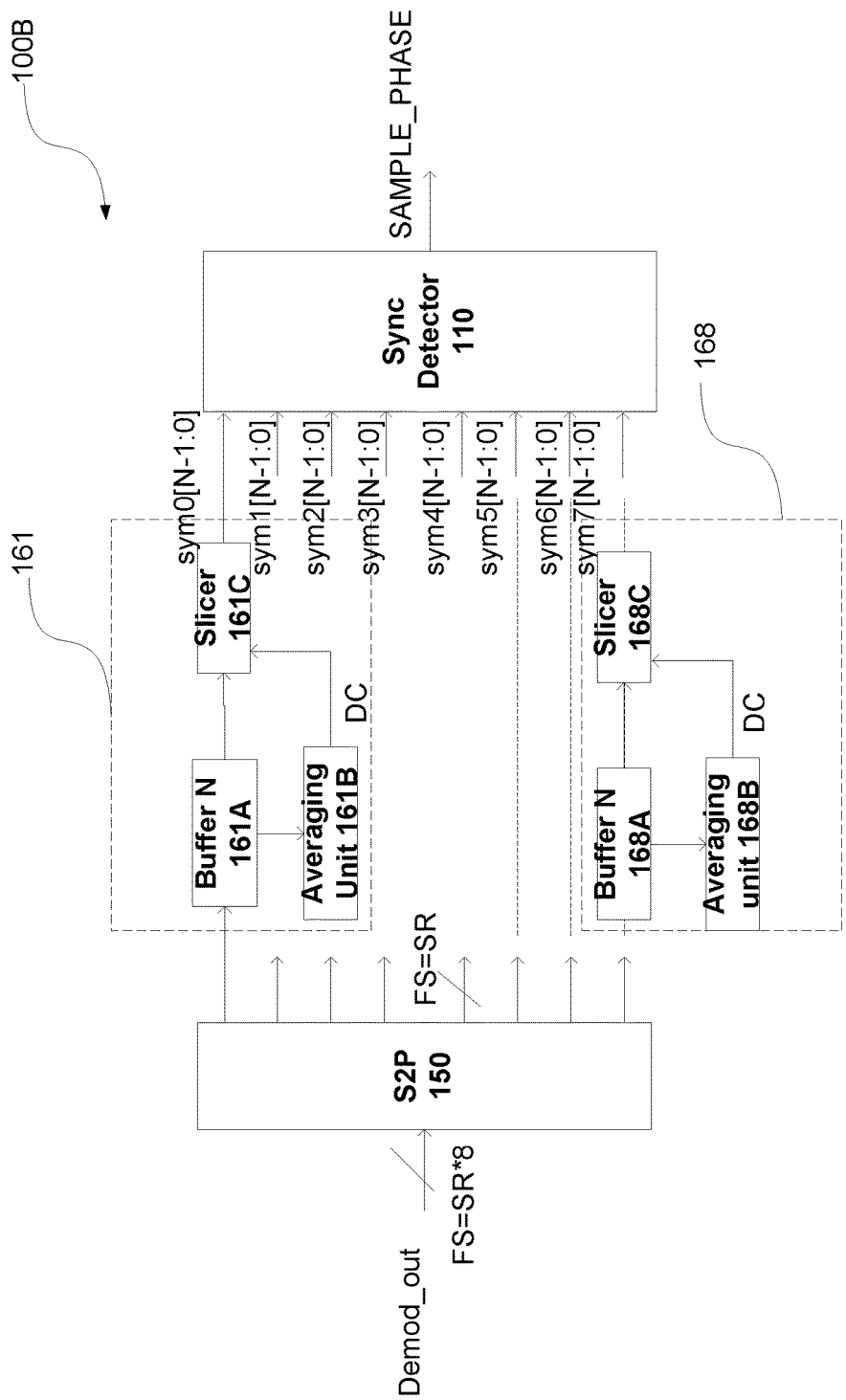
FIG. 1B is a circuit diagram of some components of a receiver according to another embodiment of the invention.

FIG. 1B is a circuit diagram of some components of a receiver 100B according to another embodiment of the invention. Referring to FIG. 1B, alternatively, the receiver 100B further comprises a serial to parallel converter 150, a plurality of branches of treatment units 161-168 communicatively coupled to the serial to parallel converter 150. FIG. 1B also shows the sync detector 110 which is communicatively coupled to the plurality of branches of treatment units 161-168. Note the sync detector 110 has already been shown and discussed with respect to FIG. A.

The serial to parallel converter 150 is configured to convert a serial demodulated signal Demod_out into a plurality of branches of a parallel demodulated signal, wherein each branch of the plurality branches of the parallel demodulated signal includes a plurality of symbols corresponding to a syncword. In an embodiment, the serial to parallel converter 150 in the receiver 100B converts the serial demodulated signal Demod_out into eight branches of a parallel demodulated signal. Signals of each of the eight branches of parallel demodulate signal has a sample rate equaling to symbol rate SR, that is FS=SR.

The sample rate, or sample frequency, FS_DEMOD of the demodulated signal Demod_out is usually eight times of the symbol rate (SR), that is, FS_DEMOD=SR*8. Taking a digital walkie-talkie wireless communication system using four frequency-shift keying (4FSK) modulation having four symbols as an example. The four symbols are generally [−3 −1 1 3]. The corresponding frequency offsets are: [3*Fdev Fdev −Fdev 3*Fev]. For example, in the Digital Mobile Radio (DMR) standard, the symbol rate is 4.8 kbps and the Fdev is equal to 648 Hz. Each frame has a syncword used to implement the sampling phase synchronization. The syncword comprises only [−3 3]. The length of a syncword is generally 24 symbols, such as [3 −3 3 3 3 3 −3 −3 −3 3 3 −3 −3 3 −3 −3 3 −3 3 3 −3 −3 3 −3]. All 24 symbols corresponding to a syncword are averaged. The average value is a DC value, which is 0. For each symbol, a decision is performed, in which if the symbol is larger than the DC value, the symbol is decided as 3, while if the symbol is smaller than the DC value, the symbol is decided as −3.

The treatment units 161-168 comprise a plurality, or eight shown in FIG. 1B, branches. Each of the plurality branches of treatment units 161-168 further comprises a corresponding one of the buffer N 161A-168A, a corresponding one of the averaging units 161B-168B and a corresponding one of the slicers 161C-168C. For example, the treatment unit 161 comprises a corresponding buffer N 161A, an average unit 161B and a slicer 161C, and so on. Each of the eight branches of parallel demodulated signal corresponds to a phase. Each of buffer N 161A-168A is configured to receive a branch of the plurality branches of the parallel demodulated signal.

In the following description, the treatment unit 161 is taken as an example. Those skilled in the art can understand that other treatment units 162-168 perform similar operations, and their detailed description is omitted for the brevity of description.

For example, a buffer N 161A is connected to a corresponding output port of the serial to parallel converter 150 and configured to buffer the plurality of symbols corresponding to the syncword. In an embodiment, as a syncword comprises 24 symbols, the buffer N buffers at most 24 symbols. Therefore N equals 24, which represents the size of the buffer.

The averaging unit 161B is communicatively coupled to the corresponding buffer N 161A, and configured to generate an average value by adding all the plurality of symbols corresponding to the syncword buffered in the buffer N 161A, that is, all the 24 symbols corresponding to the syncword.

The slicer 161C is communicatively coupled to both the averaging unit 161B and the buffer 161A and configured to generate a determined syncword sym0[N-1:0] based on a difference between each of the plurality of symbols corresponding to the syncword and the average value, wherein the determined syncword corresponding to a determined sample phase. For example, the averaging unit 161B averages all the 24 symbols corresponding to a syncword, and determines that the average value is 0. Then the slicer 161C calculates the difference between the demodulated output Demod_out with the average, that is, compare each of the 24 symbols buffered in the buffer 161A with the average value 0, and generates the determined syncword sym0[N-1:0]. In an embodiment that syncword comprises 24 symbols, sym0[N-1:0] is sym0[23:0]. N=24. sym0[23:0] includes 24 bits. Each bit of the sym0[23:0] is a decision value, such as 3 or −3. Similarly, each of other symbols, sym1[23:0], . . . sym7[23:0] is the respective determined syncword corresponding to its corresponding branch.

The sync detector 110 is communicatively coupled to each slicer 161C-168C of the plurality branches of treatment units 161-168 and configured to determine at least one candidate sample phase SYNC_VEC from a plurality of determined phases if at least one candidate syncword of the at least one candidate sample phase SYNC_VEC equals a predetermined sync word within the receiver 100B. For example, slicers 161C to 168C obtain 8 phase decision results sym0[23:0], sym1[23:0], sym2[23:0] . . . sym7[23:0]. The predetermined syncword is the one transmitted by the transmitter, which is pre-stored in the receiver. Each phase decision result is compared with the predetermined syncword. For example, phases 3, 4 and 5 have the phase decision results sym2[23:0], sym3[23:0] and sym4[23:0] that equal to the predetermined syncword. In other words, Phases 3, 4 and 5 have the decision results that match the predetermined syncword. Therefore, the sync detector 110 determines that the candidate sample phases SYNC_VEC that each corresponding to a candidate syncword are SYNC_VEC=[3 4 5].

The sync detector 110 further generates the sample phase by averaging the at least one candidate sample phase. Therefore SAMPLE_PHASE=(3+4+5)/3=4. Note in this example, SAMPLE_PHASE is among one of the eight phases. However, those skilled in the art can understand that since the SAMPLE_PHASE is an average of the phases whose syncword is the same as the predetermined syncword stored in the receiver 100B, the SAMPLE_PHASE may not be any of the eight input phases, and may be an average of some of the eight phases.

Referring back to FIG. 1A, according to an embodiment, the sync detector 110 first uses coarse synchronization, then the interpolator 120 uses interpolation accurate synchronization, which can increase sample rate of the entire demodulation channel. Further, the embodiment greatly reduces the cost of the system. Basically the amount of logic computation or resource consumption can be reduced to half.

Referring back to FIG. 1A, according to an embodiment, the calculator 130 uses minimum EVM to obtain the sample phase. Compared with the symbol matching, the computation amount is slightly increased. However, since the EVM calculation is only for the syncword, and the syncword only accounts for a very small amount relative to the whole frame, the overhead can be ignored.

The comparison between using minimum EVM to determine the best phase and symbol match is analogous to the comparison between soft decision to hard decision, which can get a more optimal decision results.

Figure 2:
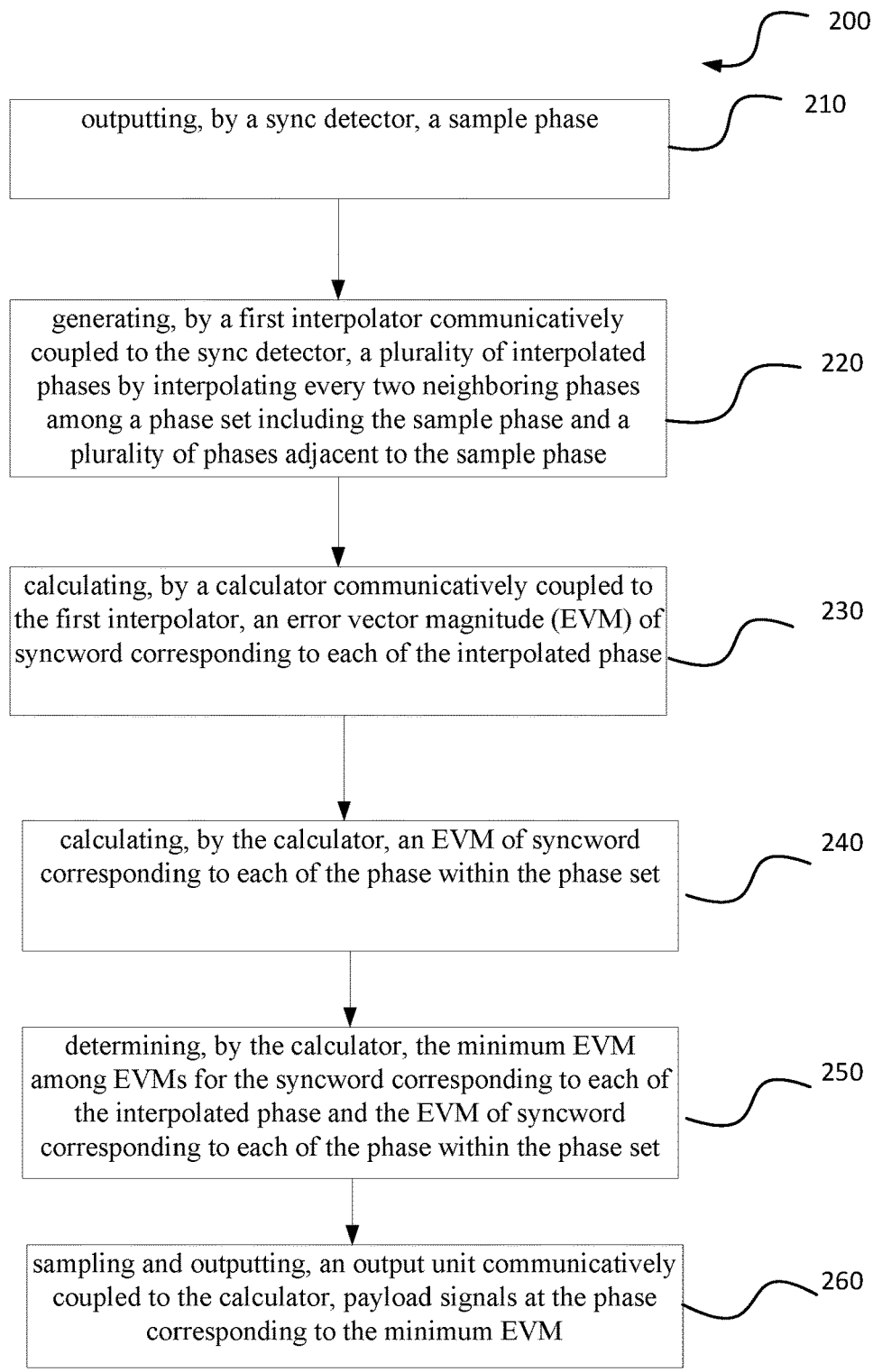
FIG. 2 is a flow chart illustrating a method 200 of outputting payload signal according to an embodiment of the invention.

FIG. 2 is a flow chart illustrating a method 200 of outputting payload signal according to an embodiment of the invention. The method 200 comprises outputting in block 210, by a sync detector, a sample phase; generating in block 220, by an interpolator communicatively coupled to the sync detector, a plurality of interpolated phases by interpolating every two neighboring phases among a phase set including the sample phase and a plurality of phases adjacent to the sample phase. wherein each of the interpolated phase and phases within the phase set corresponds to a respective syncword; calculating in block 230, by a calculator communicatively coupled to the interpolator, an error vector magnitude (EVM) of syncword corresponding to each of the interpolated phase; calculating in block 240, by the calculator, an EVM of syncword corresponding to each of the phase within the phase set; determining in block 250, by the calculator, the minimum EVM among EVMs for the syncword corresponding to each of the interpolated phase and the EVM of syncword corresponding to each of the phase within the phase set; and sampling and outputting in block 260, by an output unit communicatively coupled to the calculator, payload signals at the phase corresponding to the minimum EVM.

Alternatively, the method 200 further comprises (not shown in the drawing) converting, by a serial to parallel converter, a serial demodulated signal into a plurality branches of parallel demodulated signal, wherein each branch of the plurality branches of the parallel demodulated signal includes a plurality of symbols corresponding to a syncword; for each branch of the plurality branches of the parallel demodulated signals: buffering, by a buffer, the plurality of symbols corresponding to the syncword; generating, by an averaging unit communicatively coupled to buffer. an average value by adding all the plurality of symbols corresponding to the syncword; generating, by a slicer communicatively coupled to the averaging unit and the buffer, a determined syncword based on a difference between each of the plurality of symbols corresponding to the syncword and the average value, wherein each determined syncword corresponding to a determined sample phase; and determining, by the sync detector communicatively coupled to each slicer of the plurality branches of the treatment units, at least one candidate sample phase from a plurality of determined phases if at least one candidate syncword of the at least one candidate sample phase equals a predetermined syncword within the receiver; generating, by the sync detector, the sample phase by averaging at least one candidate sample phase.

Alternatively, sampling and outputting in block 260 are further implemented by interpolating the phase corresponding to the minimum EVM, and sampling and outputting payload signals at the interpolated phase corresponding to the minimum EVM.

Alternatively, generating a plurality of interpolated phases in block 220 is further implemented by generating an interpolated demodulated value of each of the interpolated phase by averaging its two neighboring phases from which the interpolated phase is generated.

Alternatively, the syncword includes a plurality of symbols, and calculating an EVM of syncword in block 240 is further implemented by calculating the EVM of the syncword by averaging errors for the plurality of symbols within the syncword.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

What is claimed is:

1. A receiver for determining sample phase comprising:
 a sync detector configured to output a sample phase;
 an interpolator communicatively coupled to the sync detector and configured to generate a plurality of interpolated phases by interpolating every two neighboring phases among a phase set including the sample phase and a plurality of phases adjacent to the sample phase, wherein each of the interpolated phase and phases within the phase set corresponds to a respective syncword;
 a calculator communicatively coupled to the interpolator and configured to calculate an error vector magnitude (EVM) of syncword corresponding to each of the interpolated phase and calculate an EVM of syncword corresponding to each of the phase within the phase set, and determine the minimum EVM among EVMs of the syncword corresponding to each of the interpolated phase and the EVM of syncword corresponding to each of the phase within the phase set; and
 an output unit communicatively coupled to the calculator and configured to sample and output payload signals at the phase corresponding to the minimum EVM.

2. The receiver of claim 1, further comprising:
 a serial to parallel converter, configured to convert a serial demodulated signal into a plurality of branches of a parallel demodulated signal, wherein each branch of the plurality branches of the parallel demodulated signal includes a plurality of symbols corresponding to a syncword;
 a plurality branches of treatment units each is configured to receive a branch of the plurality branches of the parallel demodulated signal, wherein each of the plurality branches of treatment units further comprises:
  a buffer connected to the serial to parallel converter and configured to buffer the plurality of symbols corresponding to the syncword;
  an averaging unit communicatively coupled to buffer and configured to generate an average value by adding all the plurality of symbols corresponding to the syncword;
  a slicer communicatively coupled to the averaging unit and the buffer and configured to generate a determined syncword based on a difference between each of the plurality of symbols corresponding to the syncword and the average value, wherein each determined syncword corresponding to a determined phase; and
 the sync detector is further communicatively coupled to each slicer of the plurality branches of treatment units and configured to determine at least one candidate sample phase from a plurality of determined phases if at least one candidate syncword of the at least one candidate sample phase equals a predetermined syncword within the receiver, and generate the sample phase by averaging the at least one candidate sample phase.

3. The receiver of claim 1, wherein the output unit is further configured to:
 interpolate the phase corresponding to the minimum EVM, and sample and output payload signals at the interpolated phase corresponding to the minimum EVM.

4. The receiver of claim 1, wherein
 the interpolator is further configured to generate an interpolated demodulated value of each of the interpolated phase by averaging demodulated values of its two neighboring phases from which the interpolated phase is generated.

5. The receiver of claim 1, wherein the syncword includes a plurality of symbols, and
 the calculator is further configured to calculate the EVM of the syncword by averaging errors for the plurality of symbols within the syncword.

6. A method of determining sample phase comprising:
 outputting, by a sync detector, a sample phase;
 generating, by an interpolator communicatively coupled to the sync detector, a plurality of interpolated phases by interpolating every two neighboring phases among a phase set including the sample phase and a plurality of phases adjacent to the sample phase, wherein each of the interpolated phase and phases within the phase set corresponds to a respective syncword;
 calculating, by a calculator communicatively coupled to the interpolator, an error vector magnitude (EVM) of syncword corresponding to each of the interpolated phase; and
 calculating, by the calculator, an EVM of syncword corresponding to each of the phase within the phase set;
 determining, by the calculator, the minimum EVM among EVMs for the syncword corresponding to each of the interpolated phase and the EVM of syncword corresponding to each of the phase within the phase set; and
 sampling and outputting, by an output unit communicatively coupled to the calculator, payload signals at the phase corresponding to the minimum EVM.

7. The method of claim 6, further comprising:
 converting, by a serial to parallel converter, a serial demodulated signal into a plurality branches of parallel demodulated signal, wherein each branch of the plurality branches of the parallel demodulated signal includes a plurality of symbols corresponding to a syncword;
 for each branch of the plurality branches of the parallel demodulated signals:
  buffering, by a buffer, the plurality of symbols corresponding to the syncword;

generating, by an averaging unit communicatively coupled to buffer, an average value by adding all the plurality of symbols corresponding to the syncword;

generating, by a slicer communicatively coupled to the averaging unit and the buffer, a determined syncword based on a difference between each of the plurality of symbols corresponding to the syncword and the average value, wherein each determined syncword corresponding to a determined sample phase; and determining, by the sync detector communicatively coupled to each slicer of the plurality of branches of the treatment units, at least one candidate sample phase from a plurality of determined phases if at least one candidate syncword of the at least one candidate sample phase equals a predetermined syncword within the receiver;

generating, by the sync detector, the sample phase by averaging at least one candidate sample phase.

8. The method of claim 6, wherein sampling and outputting are further implemented by:

interpolating the phase corresponding to the minimum EVM, and sampling and outputting payload signals at the interpolated phase corresponding to the minimum EVM.

9. The method of claim 6, wherein generating a plurality of interpolated phases is further implemented by generating an interpolated demodulated value of each of the interpolated phase by averaging demodulated values of its two neighboring phases from which the interpolated phase is generated.

10. The method of claim 6, wherein the syncword includes a plurality of symbols, and calculating an EVM of syncword is further implemented by calculating the EVM of the syncword by averaging errors for the plurality of symbols within the syncword.

* * * * *